US012385632B2

(12) United States Patent
Qiu

(10) Patent No.: US 12,385,632 B2
(45) Date of Patent: Aug. 12, 2025

(54) ROTARY FOLDING LAMP

(71) Applicant: NINGBO FUTAI ELECTRIC LIMITED, Zhejiang (CN)

(72) Inventor: Fujun Qiu, Zhejiang (CN)

(73) Assignee: NINGBO FUTAI ELECTRIC LIMITED, Ningbo (CN)

(*) Notice: Subject to any disclaimer, the term of this patent is extended or adjusted under 35 U.S.C. 154(b) by 0 days.

(21) Appl. No.: 18/676,420

(22) Filed: May 28, 2024

(65) Prior Publication Data

US 2024/0401787 A1 Dec. 5, 2024

(30) Foreign Application Priority Data

Jun. 2, 2023 (CN) ......................... 202310647964.4
Jun. 2, 2023 (CN) ......................... 202321384644.6

(51) Int. Cl.
*F21V 21/26* (2006.01)
*F21V 21/14* (2006.01)
*F21V 21/40* (2006.01)
*F21Y 113/00* (2016.01)

(52) U.S. Cl.
CPC ............ *F21V 21/26* (2013.01); *F21V 21/145* (2013.01); *F21V 21/40* (2013.01); *F21Y 2113/00* (2013.01)

(58) Field of Classification Search
CPC ........ F21V 21/26; F21V 21/145; F21V 21/40; F21Y 2113/00
See application file for complete search history.

(56) References Cited

U.S. PATENT DOCUMENTS

| | | | | |
|---|---|---|---|---|
| 8,348,483 | B2 * | 1/2013 | Lin | F21L 4/045 362/427 |
| 10,323,802 | B2 * | 6/2019 | Zheng | F21L 4/027 |
| 2011/0141737 | A1 * | 6/2011 | Gu | F21V 21/26 362/427 |
| 2012/0281421 | A1 * | 11/2012 | Lin | F21L 4/045 362/427 |
| 2022/0136663 | A1 * | 5/2022 | Qiu | F21L 4/02 362/33 |

* cited by examiner

*Primary Examiner* — Abdulmajeed Aziz
*Assistant Examiner* — Jessica M Apenteng
(74) *Attorney, Agent, or Firm* — Ying-Ting Chen

(57) ABSTRACT

A rotary folding lamp includes a support assembly, a light emitting assembly, a rotation assembly, a folding assembly and a control component, the light emitting assembly includes a first light emitting part and a second light emitting part which is foldably connected to the first light emitting part, the rotation assembly is arranged between the first light emitting part and the support assembly to allow the first light emitting part to rotate with respect to the support assembly, the folding assembly is arranged between the support assembly and the rotation assembly to allow the first light emitting part to be folded onto the support assembly.

19 Claims, 11 Drawing Sheets

ROTARY FOLDING LAMP

CROSS REFERENCE OF RELATED APPLICATION

This application is a non-provisional application that claims priority under 35 U.S.C. § 119 to China application number CN202310647964.4, filing date Jun. 2, 2023, and China application number CN202321384644.6, filing date Jun. 2, 2023, wherein the entire content of which is expressly incorporated herein by reference.

BACKGROUND OF THE PRESENT INVENTION

Field of Invention

The present invention relates to foldable handheld lamp, and more particularly to a rotary folding lamp.

Description of Related Arts

With the acceleration of modern life rhythm and the change of lifestyle, night outdoor work, outdoor camping, and outdoor late-night snacks have become very common. However, due to the insufficient brightness and inconvenient lighting outdoors at night, outdoor night lights have become a necessary tool for night outdoor work.

For conventional lamps, some have oversized dimensions, which are inconvenient to carry; some lamps, although meeting the requirements of being small and portable, have a single lighting angle and limited lighting range, which cannot meet the needs of users; some lamps, although achieving the corresponding brightness, cannot meet the needs of multi-occasion applications. Therefore, there is an urgent need for a compact and portable lamp that can provide all-round lighting and adjust the lighting angle and range according to the needs, so as to meet the users' various needs.

SUMMARY OF THE PRESENT INVENTION

An advantage of the present invention is to provide a rotary folding lamp, wherein the rotary folding lamp can present multi-angle illumination through rotation, and has a larger illumination range, so that it is suitable for multiple occasions.

Another advantage of the present invention is to provide a rotary folding lamp, wherein the rotary folding lamp can be folded multiple times, and the folded volume is small and easy to carry.

Another advantage of the present invention is to provide a rotary folding lamp, wherein the rotary folding lamp is suitable for bidirectional folding, achieving a folding angle of 360°, making the folding operation simpler, and can be fixed at any angle and provide a larger range of angle control.

Another advantage of the present invention is to provide a rotary folding lamp, wherein the rotary folding lamp comprises multiple light emitting parts, and the multiple light emitting parts have multiple lighting modes, and different light emitting parts can be activated according to the different folding and unfolding states, thus having multiple lighting modes and multiple lighting ranges, which can meet the various application needs of different users.

Another advantage of the present invention is to provide a rotary folding lamp, wherein the rotary folding lamp can be fixed in various ways such as hanging, sticking, adsorbing, handheld, and standing plane, and the user can choose according to their needs.

Another advantage of the present invention is to provide a rotary folding lamp, wherein the rotary folding lamp can be manually rotated and folded, or automatically rotated and folded, and the folding state and the unfolding state can be switched arbitrarily with simple operation.

Another advantage of the present invention is to provide a rotary folding lamp, wherein the rotary folding lamp is rechargeable and suitable for outdoor applications.

Another advantage of the present invention is to provide a rotary folding lamp with multiple folding parts and rotating parts, which can be fixed at any angle within the folding angle and rotating angle range of each part for use. Therefore, it can achieve lighting in a certain direction as well as all-round lighting.

According to one aspect, the present invention provides a rotary folding lamp comprising:

a support assembly;

a light emitting assembly, wherein the light emitting assembly comprises a first light emitting part and a second light emitting part which is foldably connected to the first light emitting part;

a rotation assembly arranged between the first light emitting part and the support assembly to allow the first light emitting part to rotate with respect to the support assembly;

a folding assembly arranged between the support assembly and the rotation assembly to allow the first light emitting part to be folded onto the support assembly; and a control component arranged on the support assembly and electrically connected to the light emitting assembly.

According to an embodiment, the folding assembly comprises a first folding element, a second folding element, and a third folding element, which are respectively provided on the support assembly, the first light emitting part, and the second light emitting part, wherein the third folding element is configured to be movable around the second folding element.

According to an embodiment, the rotation assembly comprises a first rotating element and a second rotating element, wherein the first rotating element is rotatably connected to the first folding element, and the second rotating element is connected to the first light emitting part, wherein the second rotating element is rotatably connected to the first rotating element.

According to an embodiment, the light emitting assembly further comprises a third light emitting part which is provided on a top of the support assembly adjacent to the first folding element.

According to an embodiment, the first light emitting part comprises a first light source and a first attaching surface, the second light emitting part comprises a second light source and a second attaching surface, the first light source is provided at a side of the first attaching surface, and the second light source is provided at a side of the second attaching surface, after folding, the first attaching surface is attached with the second attaching surface, and is capable of being aligned in a same straight line with the support assembly.

According to an embodiment, the second light emitting part further comprises a third light source, and the second light source and the third light source are respectively installed on two sides of the second attaching surface.

According to an embodiment, the folding assembly comprises a first folding element, a second folding element, a third folding element, and a folding connecting element, wherein the first folding element is positioned between the support assembly and the first light emitting part, the folding connecting element is rotatably connected between the second folding element and the third folding element, the second folding element and the third folding element are respectively positioned between the first light emitting part and the second light emitting part, wherein the second light emitting part is capable of folding in two directions towards the first light emitting part and is capable of being fixed at any folding angle between 0° and 360°.

According to an embodiment, the support assembly comprises an installation housing, a power supply component, and has an installation cavity and a storage cavity, wherein the installation cavity is formed inside the installation housing, and the power supply component is installed in the installation cavity, the storage cavity is formed as a side of the installation housing to accommodate the first light emitting part and the second light emitting part in a folded state.

According to an embodiment, the control component comprises a control switch, a light emitting adjusting component, and a circuit module, the circuit module is electrically connected to the light emitting assembly, the power supply component, the light emitting adjusting component, and the control switch, and the circuit module is installed in the installation cavity, the control switch and the light emitting adjusting component are positioned at an outside of the installation housing.

According to an embodiment, the control component further comprises a rotation control component and a folding control component, wherein the rotation control component and the folding control component are arranged on an outside of the housing and are electrically connected to the circuit module, the rotation assembly is operatively controlled by the rotation control component, and the folding assembly is operatively controlled by the folding control component.

According to an embodiment, the support assembly further comprises a first fixing part, a second fixing part, and a third fixing part, all of which are arranged at a bottom of the installation housing.

According to another aspect, the present invention provides a rotary folding lamp, comprising:

- a support assembly;
- a light emitting assembly, wherein the light emitting assembly comprises a first light emitting part, a second light emitting part, and a third light emitting part, wherein the second light emitting part is foldable and rotatably connected to the first light emitting part, and the third light emitting part is arranged on a top of the support assembly;
- a rotation assembly arranged at two ends of the first light emitting part, and through the rotation assembly, the first light emitting part is capable of rotating with respect to the support assembly and the second light emitting part;
- a folding assembly connected to the rotation assembly, and through the folding assembly, the first light emitting part and the second light emitting part are capable of switching between a folded state and an unfolded state; and
- a control component provided on the support assembly and electrically connected to the light emitting assembly.

According to an embodiment, the folding assembly comprises a first rotating folding member and a second rotating folding member, wherein the first rotating folding member is provided at a top of the support assembly to enabling a folding between the first light emitting part and the support assembly, wherein the second rotating folding member is provided at a top of the first light emitting part to enable a folding between the second light emitting part and the first light emitting part.

According to an embodiment, the rotation assembly comprises a first rotating element, a second rotating element, a third rotating element, and a fourth rotating element, the first rotating element is rotatably connected to the first rotating folding member, the second rotating element is positioned at a bottom of the first light emitting part and is rotatably connected to the first rotating element for driving the first light emitting part to rotate around the support assembly, wherein during movement of the first rotating element around the first rotating folding member, the first light emitting part is driven to be folded or unfolded with respect to the support assembly, wherein the third rotating element is rotatably connected to the second rotating folding member, the fourth rotating element is positioned at a bottom of the second light emitting part and is rotatably connected to the third rotating element for driving the second light emitting part to rotate around the first light emitting part, wherein during movement of the third rotating element around the second rotating folding member, the second light emitting part is driven to be folded or unfolded with respect to the first light emitting part.

According to an embodiment, the control component comprises a control switch, a light emitting adjusting component, a circuit module, a rotation control component, and a folding control component, wherein the circuit module is electrically connected to the control switch, the light emitting adjusting component, and the light emitting assembly, wherein the rotation control component is electrically connected to the circuit module for operatively driving the rotation assembly to control rotation of the light emitting assembly within an angle range of 0°-360°, wherein the folding control component is electrically connected to the circuit module for driving the folding assembly to control folding of the light emitting assembly.

According to an embodiment, the support assembly comprises an installation housing, a handheld part, a first fixing part, a second fixing part, a third fixing part, an electrical connection terminal, and a power supply component, wherein the handheld part is installed on an outer side of the installation housing, the first fixing part, the second fixing part, and the third fixing part are all located at a bottom of the installation housing, the power supply component is installed inside the installation housing and is electrically connected to the control component and the electrical connection terminal, the electrical connection terminal is provided on the installation housing.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
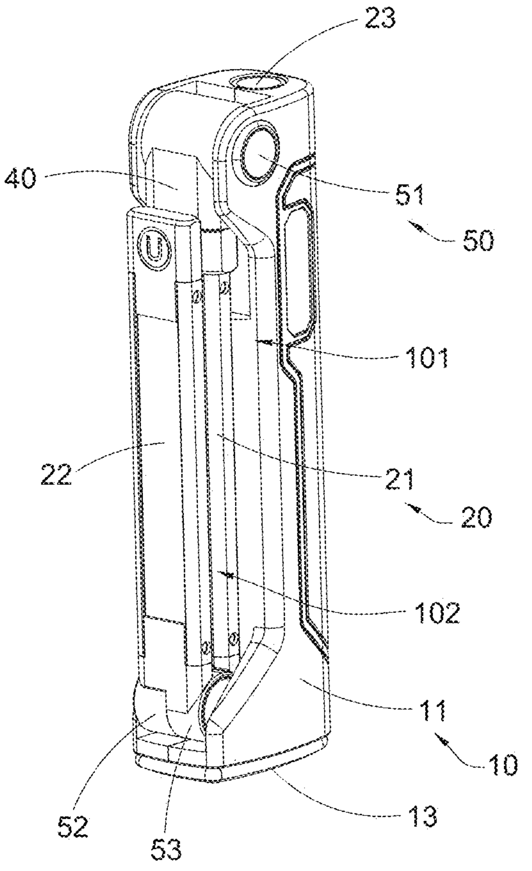
FIG. 1 is a perspective view of a rotary folding lamp according to a first preferred embodiment of the present invention.
Figure 2:
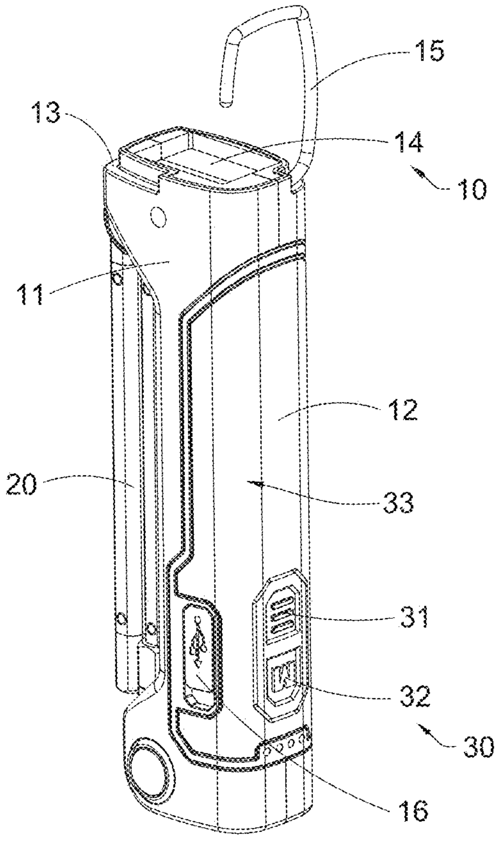
FIG. 2 is another perspective view of the rotary folding lamp according to the above-mentioned first preferred embodiment of the present invention.
Figure 3:
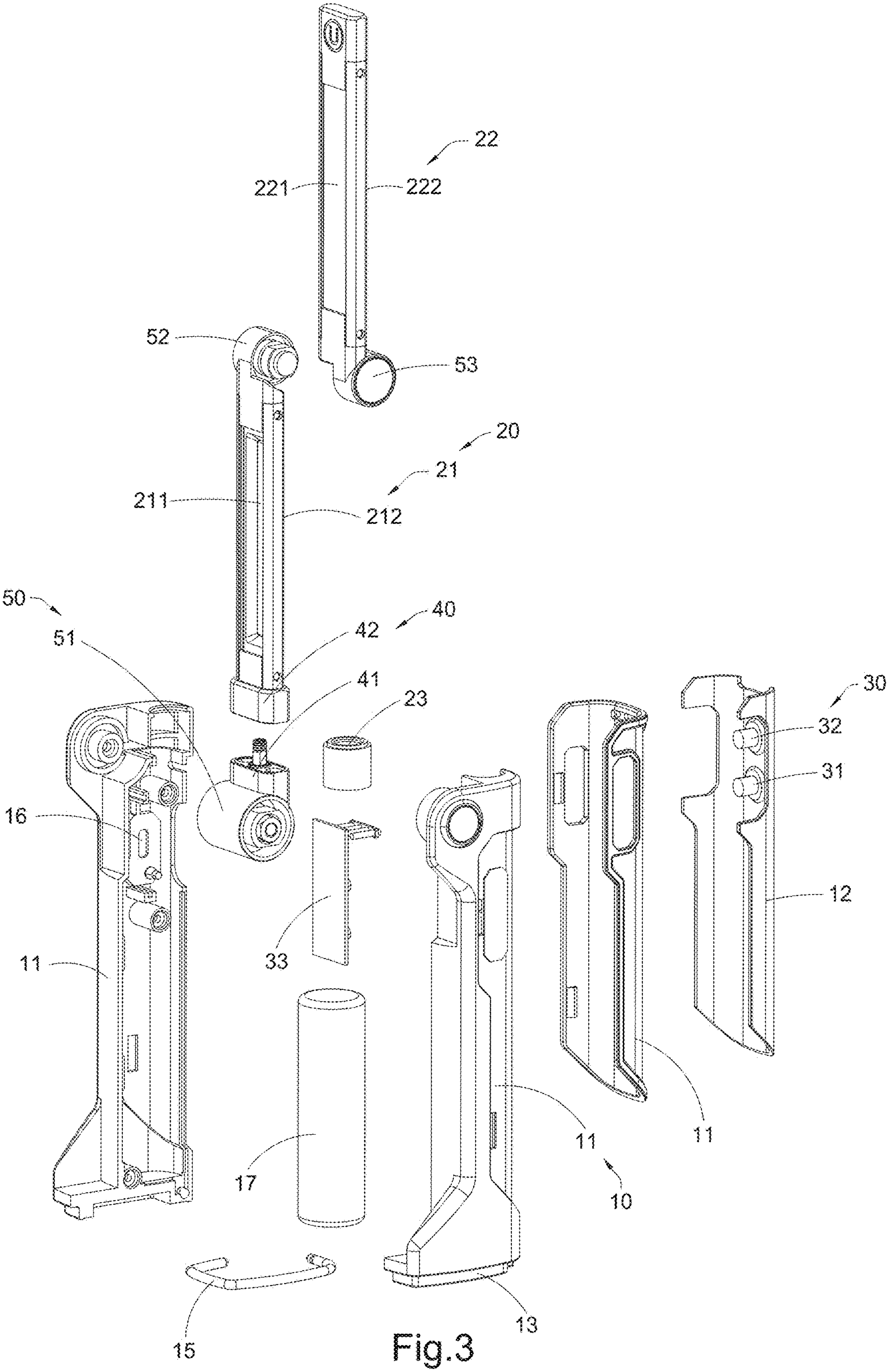
FIG. 3 is an exploded view of the rotary folding lamp according to the above first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIGS. 1 to 7 of the drawings, a rotary folding lamp according to a first preferred embodiment of the present invention is illustrated. In this embodiment, the rotary folding lamp comprises a support assembly 10, a light emitting assembly 20, a control component 30, a rotation assembly 40, and a folding assembly 50. The light emitting assembly 20 is installed on the top of the support assembly 10, the control component 30 is provided on the support assembly 10 and is used to control the light emitting assembly 20. The rotation assembly 40 is connected between the support assembly 10 and the light emitting assembly 20 for achieving the rotation of the light emitting assembly 20 with respect to the support assembly 10. The folding assembly 50 is connected to the light emitting assembly 20, and the folding and unfolding process of the light emitting assembly 20 is completed through the folding assembly 50.

The support assembly 10 comprises an installation housing 11, a handheld part 12, and a first fixing part 13. The handheld part 12 is located on a side of the installation housing 11 and is suitable for the user to hold. The first fixing part 13 is located at a bottom of the installation housing 11 for allowing the support assembly 10 and the light emitting assembly 20 connected to a top of the support assembly 10 to stand on a plane, so as to free the user's hands and meet the user's needs.

The handheld part 12 adopts ergonomic design to provide a more comfortable grip for the user. The handheld part 12 also has an anti-slip function for ensuring a firmer grip. The handheld part 12 can be made of anti-slip material or achieve anti-slip function by setting rounded anti-slip protrusions and grooves, etc.

The support assembly 10 further comprises a second fixing part 14 which is disposed on the first fixing part 13. The second fixing part 14 is implemented as a magnet for fixing the rotary folding lamp to a surface of an object through magnetic attraction, so as to free the user's hands.

After the second fixing part 14 is set at the bottom of the first fixing part 13, the bottom surface of the first fixing part 13 provides a flat surface by the second fixing part 14, and the first fixing part 13 can still stand on a plane. When standing on a magnetic object surface, the second fixing part 14 assists the first fixing part 13 through magnetic attraction, making the fixation more secure. In addition, the magnetic attraction of the second fixing part 14 allows the rotary folding lamp to be fixed at different angles on a magnetic object surface, so as to meet the user's different needs.

The support assembly 10 further comprises a third fixing part 15 which is also set on the first fixing part 13. The third fixing part 15 is implemented as a suspension component which allows the rotary folding lamp to be suspended on an object through the third fixing part 15, making it convenient for the user to carry and preventing loss. It also facilitates the fixation of the lamp when the user is unable to hold it conveniently.

The first fixing part 13 has a cavity that can accommodate the suspension component of the third fixing part 15, so that the third fixing part 15 can be stored inside the first fixing part 13 when not in use, and the bottom of the first fixing part 13 remains flat and can stand on a plane.

The support assembly 10 further comprises an electrical connection terminal 16 and a power supply component 17. The power supply component 17 is electrically connected to the electrical connection terminal 16 and the light emitting assembly 20. The electrical connection terminal 16 is set in the installation housing 11 and is connected to a power source to charge the power supply component 17 and provides power to the light emitting assembly 20.

In addition, it will be understood by those skilled in the art that, apart from this embodiment, under the concept of the present invention, the rotary folding lamp can also be directly powered by connecting the power source to the electrical connection terminal 16.

The support assembly 10 has an installation cavity 101 which is defined inside the installation housing 11, and the power supply component 16 is installed in the installation cavity 101.

The support assembly 10 also has a storage cavity 102 which is formed at a side of the installation housing 11 and matches the shape and size of the light emitting assembly 20. The storage cavity 102 is used to accommodate the light emitting assembly 20, so that after the light emitting assembly 20 is accommodated, it is flush with the periphery of the installation housing 11, making the folded rotating lamp smaller in volume and aesthetically pleasing.

It is worth mentioning that the inside of the storage cavity 102 has a scratch-resistant function which can protect the light emitting assembly 20 and extend its service life. Therefore, the inside of the storage cavity 102 can be designed with rounded protrusions and grooves to support the light emitting assembly 20, or it can be made of soft materials to prevent damage to the light emitting assembly 20 caused by rigid design.

The light emitting assembly 20 comprises at least two light emitting parts. In this embodiment, the light emitting parts comprises a first light emitting part 21, a second light emitting part 22, and a third light emitting part 23. One end of the first light emitting part 21 is connected to the rotation assembly 40, the rotation assembly 40 is connected to the top of the support assembly 10 through the folding assembly 50. The second light emitting part 22 is foldably connected to the other end of the first light emitting part 21. The third light emitting part 23 is set on the top of the installation housing 11 adjacent to the rotation assembly 40.

In this embodiment, the light emitting assembly 20 comprises two foldable light emitting parts, namely the first light emitting part 21 and the second light emitting part 22, both of which are elongated light emitting strips. The volume is reduced by folding twice through the folding assembly 50. It will be understood by those skilled in the art that the light emitting assembly 20 can also achieve multiple folds by setting more light emitting parts to meet more requirements under stable conditions. In addition, the first light emitting part 21 and the second light emitting part 22 can also be set to other shapes, and are not limited by this embodiment.

The control component 30 comprises a control switch 31 which is disposed in the installation housing 11 and electrically connected to the power supply component 17, the first light emitting part 21, the second light emitting part 22, and the third light emitting part 23. The user controls the illumination of the light emitting assembly 20 by operating the control switch 31.

In this embodiment, the control switch 31 is programmed to comprise different controlling modes. By operating the control switch 31 at different modes, the control switch 31 can selectively control one, two, or three of the first light emitting part 21, the second light emitting part 22, and the third light emitting part 23 to be opened or closed individually or simultaneously.

The control component 30 further comprises a light emitting adjusting component 32 which is electrically connected to the light emitting assembly 20 to regulate the brightness of the light emitting assembly 20. For example, by controlling the number of times the light emitting adjusting component 32 being pressed, the light emitting assembly 20 can switch between strong light, medium light, weak light, daylight, red light, blue light, etc., and the lighting can switch between high brightness, low brightness, and various modes to meet the different needs of the user.

Those skilled in the art will understand that the above-mentioned different lights are just examples. Under the concept of the present invention, the light emitting assembly 20 can have different illumination to meet the lighting needs of the user for various outdoor activities such as work, repair, camping, exploration, fishing, as well as for various leisure activities. It can also meet the needs of users for occasions such as birthday parties and entertainment by setting colored lights.

In this embodiment, the rotation and folding of the light emitting assembly 20 are manually controlled, and the user can change its rotation angle and folding angle by applying an external force to the light emitting assembly 20. In other embodiments of the present invention, the rotation and folding of the light emitting assembly 20 are automatically controlled by a switch. In another embodiment, the light emitting assembly 20 switches between different light emitting modes of different light emitting portions during the folding and rotation process.

The control component 30 further comprises a circuit module 33 which is disposed within the installation housing 11 in the installation cavity 101 and is electrically connected to the first light emitting part 21, the second light emitting part 22, the third light emitting part 23, the power supply component 17, the control switch 31, and the light emitting adjusting component 32. The circuit module 33 is operated by operating the control switch 31 and the light emitting adjusting component 32. In addition, the control component 30 may also include a battery display section, etc.

Figure 7:
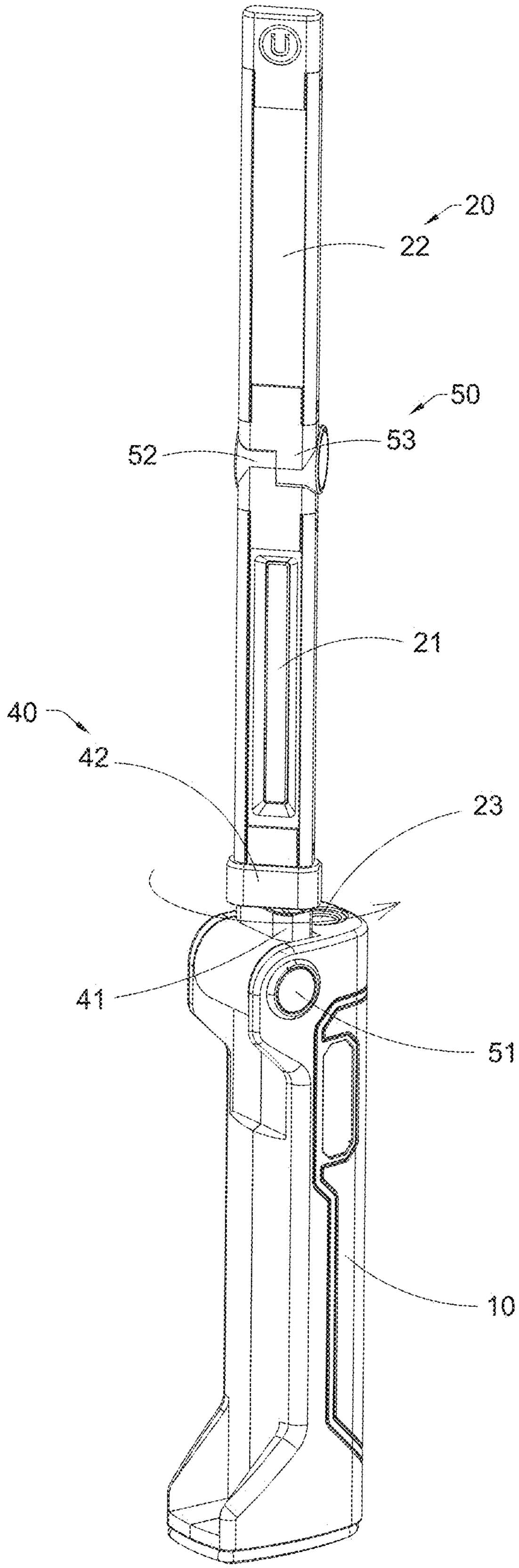
FIG. 7 is another schematic view illustrating a fourth working state of the rotary folding lamp according to the above first preferred embodiment of the present invention.

Referring to FIG. 7, the rotation assembly 40 comprises a first rotating element 41 and a second rotating element 42. One end of the second rotating element 42 is rotatably connected to the first rotating element 41, and the other end of the second rotating element 42 is connected to a bottom end of the first light emitting part 21. The rotation between the second rotating element 42 and the first rotating element 41 allows the first light emitting part 21 to rotate 360° around the support assembly 10, and the second light emitting part 22 rotates correspondingly with the rotation of the first light emitting part 21.

Referring to FIGS. 3 to 6, the folding assembly 50 comprises a first folding element 51 which is connected and fixed to the top of the installation housing 11. The first rotating element 41 is connected to the first folding element 51 and can rotate around the first folding element 51. By applying an external force to the first rotating element 41, the first rotating element 41 can move around the first folding element 51, thereby folding the light emitting assembly 20 and storing it in the storage cavity 102, so as to achieve a first folding of the light emitting assembly 20.

The folding assembly 50 further comprises a second folding element 52 and a third folding element 53. The third folding element 53 is rotatably connected to the second folding element 52, the second folding element 52 is connected to the top of the first light emitting part 21, and the third folding element 53 is connected to the bottom of the second light emitting part 22. During the rotation around the second folding element 52, the third folding element 53 drives the second light emitting part 22 to rotate, causing the second light emitting part 22 to fold with the first light emitting part 21, and both of them are folded in a straight line. In other words, through the second folding element 52 and the third folding element 53, the light emitting assembly 20 achieves secondary folding, and then it is accommodated in the storage cavity 102, resulting in a smaller volume of the entire rotary folding lamp.

It is worth mentioning that the first light emitting part 21 and the support assembly 10 achieve a first folding between them, and the second light emitting part 22 achieves a second folding with the first light emitting part 21, the folding angles are all 0°-180°. The first light emitting part 21 rotates around the support assembly 10 with a rotation angle of 0°-360°, and can stay at any angle within this folding angle and rotation angle range to achieve multi-angle illumination, which can be adjusted in real time according to actual usage requirements.

Those skilled in the art will understand that in this embodiment, the specific structures of the first folding element 51, the second folding element 52, and the third folding element 53 in the drawings are provided as examples. Under the concept of the present invention, the first folding element 51, the second folding element 52, and the third folding element 53 can also be implemented as threaded connections, rotating shafts and slot matching connections, and other structures of pin and hole connections, all of which are within the scope of the present invention.

In this embodiment, the first light emitting part 21 and the second light emitting part 22 are both strip-shaped and have only one light source each, namely, the first light emitting part 21 and the second light emitting part 22 both emit light from one side. When the first light emitting part 21 is folded with the second light emitting part 22, the side surfaces of the first light emitting part 21 and the second light emitting part 22 without light sources are abutted and adhered to each other, so that it is advantageous for protecting the light source surface.

Figure 5:
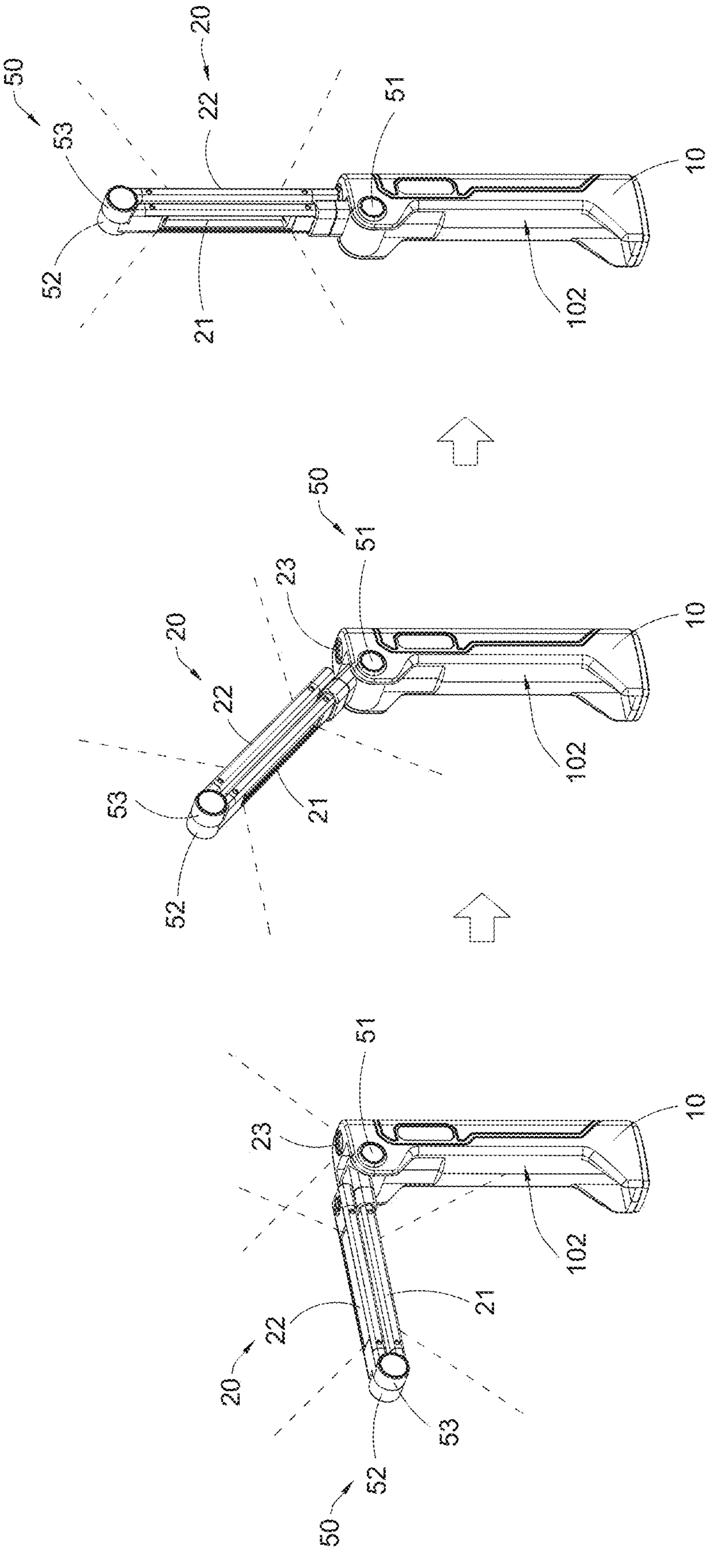
FIG. 5 is another schematic view illustrating a second working state of the rotary folding lamp according to the above first preferred embodiment of the present invention.
Figure 6:
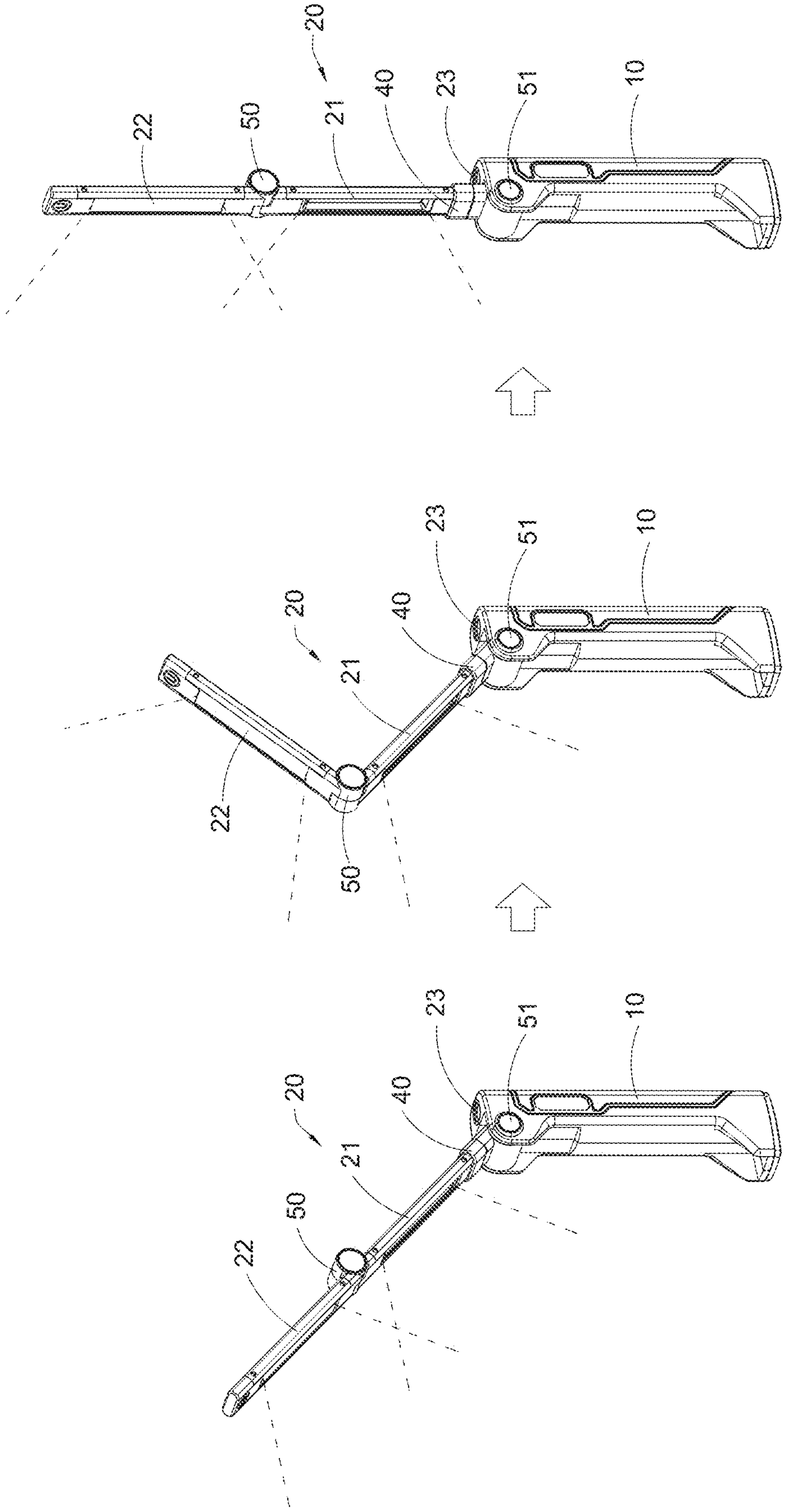
FIG. 6 is another schematic view illustrating a third working state of the rotary folding lamp according to the above first preferred embodiment of the present invention.

Specifically, referring to FIG. 5, the first light emitting part 21 comprises a first light source 211 and a first attaching surface 212, and the second light emitting part 22 comprises a second light source 221 and a second attaching surface 222. The first light source 211 is positioned on a side surface of the first attaching surface 212, and the second light source 221 is positioned on a side surface of the second attaching surface 222. After folding, the attaching surfaces of the first attaching surface 212 and the second attaching surface 222 without light sources are in contact, forming a separable coupling manner between the first light emitting part 21 and the second light emitting part 22, and the first light source 211 and the second light source 221 are located in two directions facing outward. Therefore, even after folding the first light emitting part 21 and the second light emitting part 22, illumination in two directions can still be achieved.

Figure 4:
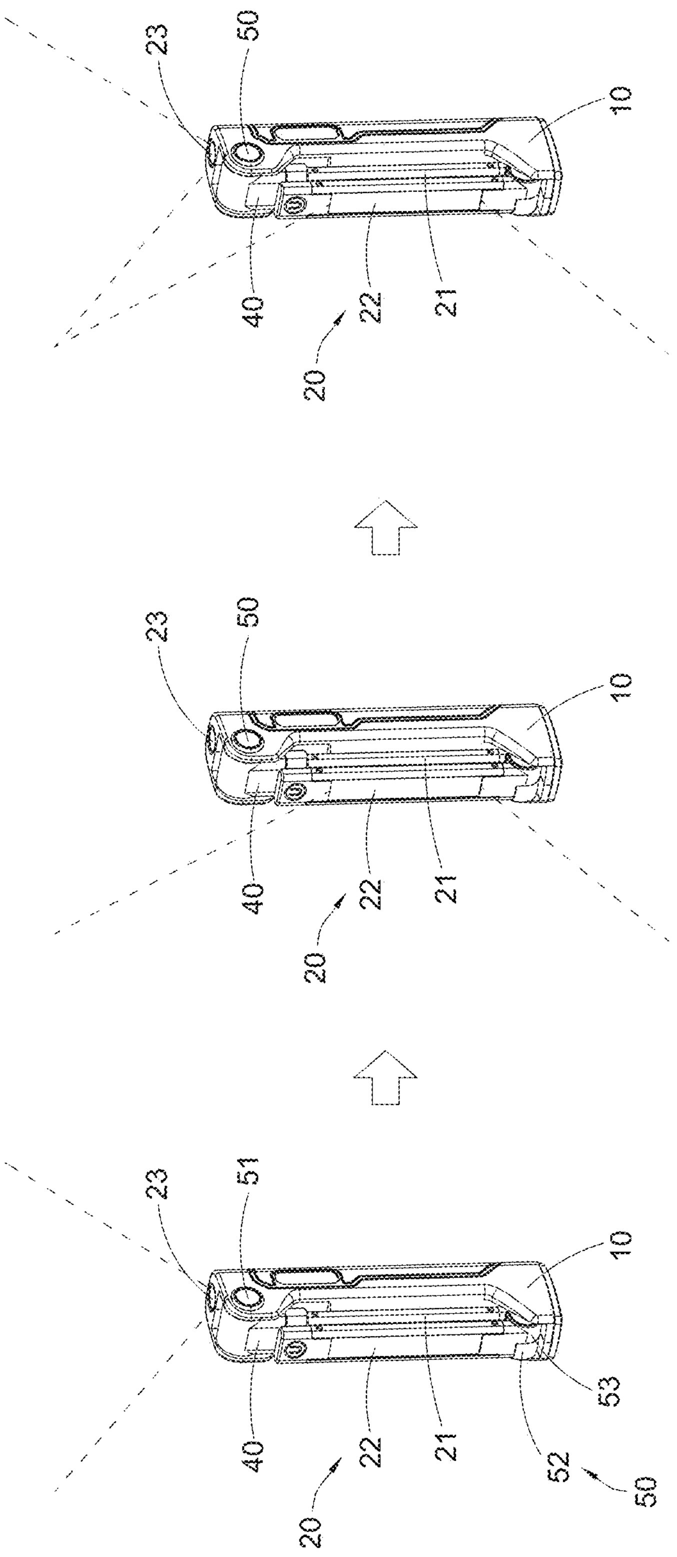
FIG. 4 is a schematic view illustrating a first working state of the rotary folding lamp according to the above preferred embodiment of the present invention.

Referring to FIG. 4, when the first light emitting part 21 and the second light emitting part 22 needs to be folded into the storage cavity 102, the first light source 211 faces the inside of the storage cavity 102, and the second light source 221 faces the outside of the storage cavity 102. At this time, the folding lamp is in its minimum volume. According to the user's needs, the user can adjust the control switch 31 to turn on the second light emitting part 22 to emit light, while turn off the first light emitting part 21 which is stored inside the storage cavity 102.

At this time, the third light emitting part 23 is illuminated alone, or the second light emitting part 22 is illuminated alone, or the third light emitting part 23 and the second light emitting part 22 are illuminated simultaneously. In this case, the first light emitting part 21 on the inner side does not emit light, which can save power on one hand and meet the demand for multi-angle illumination on the other hand. Moreover, it can prevent dangerous situations caused by the light emitted from the inner side light source.

Figure 8:
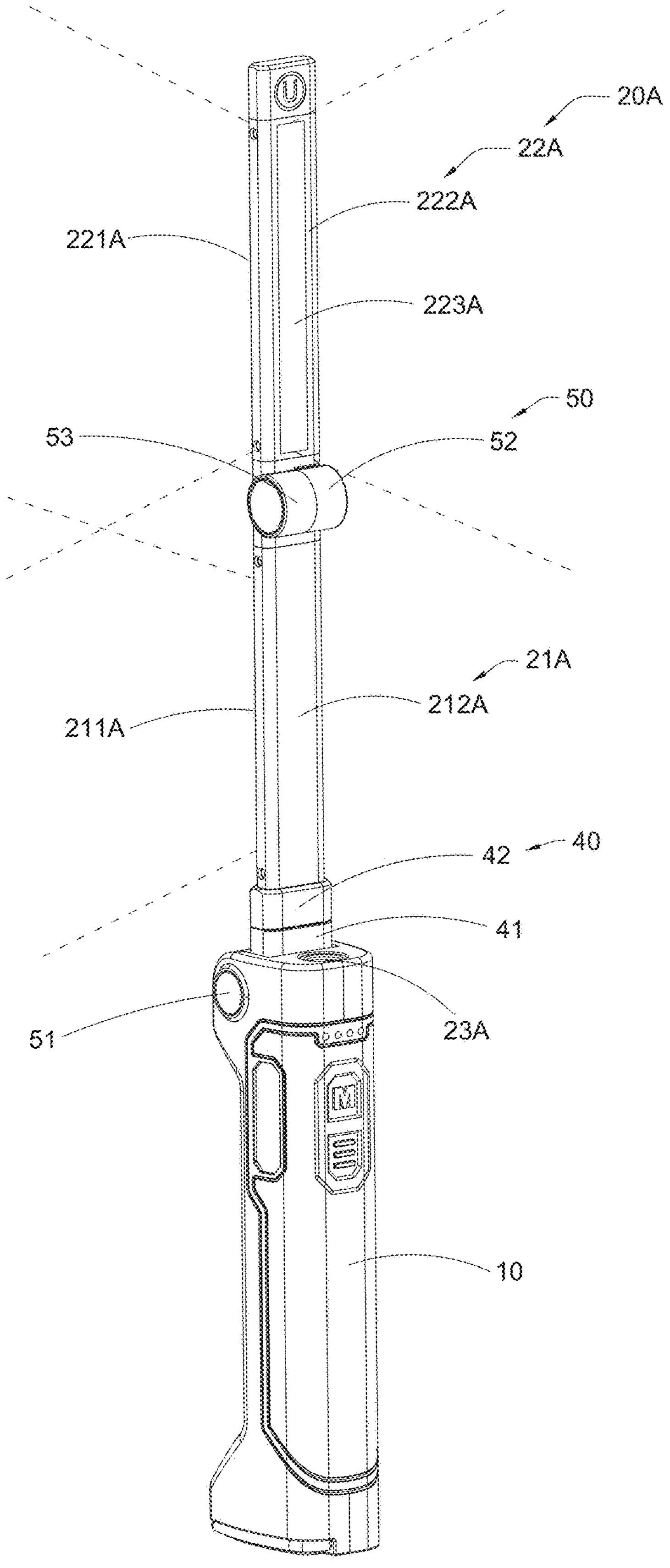
FIG. 8 is a perspective view illustrating a working state of the rotary folding lamp according to a second preferred embodiment of the present invention.

Referring to FIG. 8, a rotary folding lamp according to a second preferred embodiment of the present invention is shown. In this embodiment, improvements are made to the light emitting assembly 20A.

In this embodiment, the light emitting assembly 20A comprises a first light emitting part 21A, a second light emitting part 22A, and a third light emitting part 23A. The first light emitting part 21A comprises a first light source 211A and a first attaching surface 212A, wherein the first light source 211A is located on one side of the first attaching surface 212A.

Compared with the second light emitting part 22 in the first embodiment, the second light emitting part 22A in this embodiment comprises a second light source 221A, a second attaching surface 222A, and a third light source 223A. The second light source 221A and the third light source 223A are respectively located on two sides of the second attaching surface 222A, so that both sides of the second light emitting part 22A can emit light.

When the second light emitting part 22A and the first light emitting part 21A are both in the unfolded state, the first light emitting part 21A emits light from one side, and the second light emitting part 22A emits light from two sides. According to different tilt angles, the rotary folding lamp can present different lighting angles and have a larger lighting range.

Those skilled in the art will understand that the two sides of the first light emitting part 21A can also be equipped with two light sources to achieve a larger lighting range.

In addition to the above embodiments, a fourth light source can be set at the top of the second attaching surface 222A, so that when the second light emitting part 22A is inclined at an angle with the support assembly 20A, the fourth light source can illuminate a farther place, allowing the three light sources of the second light emitting part to present illumination at three different angles. In combination with the first light source and the two illumination directions of the third light emitting part, the rotary folding lamp has a larger illumination range, can achieve all-round illumination, is easy to carry, and is suitable for nighttime outdoor operations.

Figure 9:
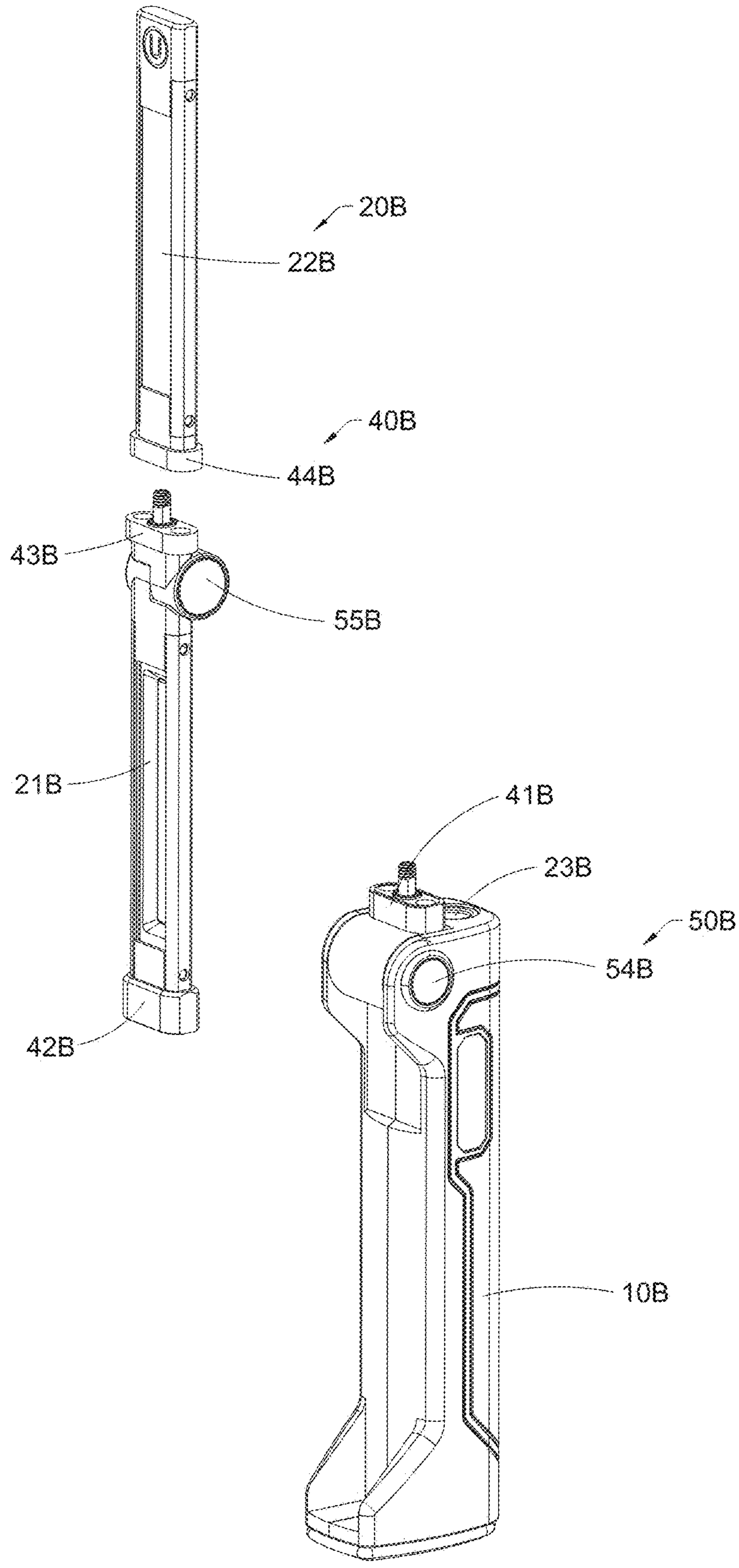
FIG. 9 is a perspective view illustrating the rotary folding lamp according to a third preferred embodiment of the present invention.
Figure 10:
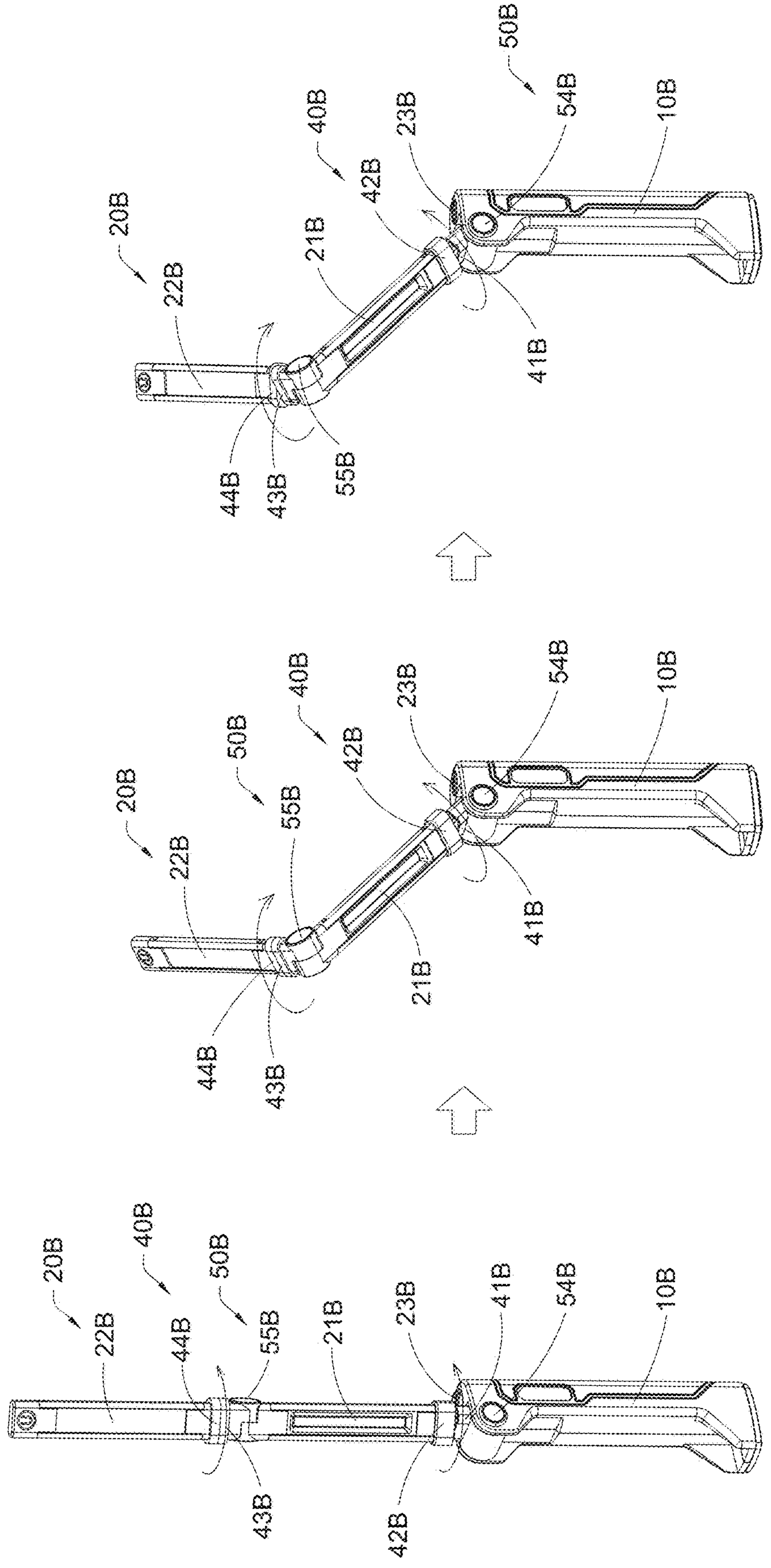
FIG. 10 is another perspective view of the rotary folding lamp according to the above third preferred embodiment of the present invention.

Referring to FIGS. 9 and 10, a rotary folding lamp according to a third preferred embodiment of the present invention is shown. In this embodiment, the rotary folding lamp comprises a support assembly 10B, a light emitting assembly 20B, a control component 30B, a rotation assembly 40B, and a folding assembly 50B. The light emitting assembly 20B is connected to the support assembly 10B, the control component 30B is set on the support assembly 10B to control the operation of the light emitting assembly 20B, and the rotation assembly 40B and the folding assembly 50B control the rotation and folding of the light emitting assembly 20B.

The support assembly 10B and the control component 30B are the same as the support assembly 10 and the control component 30 in the above embodiments, and are not described again here.

The light emitting assembly 20B comprises a first light emitting part 21B, a second light emitting part 22B, and a third light emitting part 23B. The first light emitting part 21B is foldable and rotatably connected between the second light emitting part 22B and the support assembly 10B. The third light emitting part 23B is positioned at the top of the support assembly 10B, adjacent to the bottom of the first light emitting part 21B.

In this embodiment, the folding assembly 50B comprises a first rotating folding member 54B and a second rotating folding member 55B, the first rotating folding member 54B is positioned at the top of the support assembly 10B and adjacent to the third light emitting part 23B. The second rotating folding member 55B is positioned at the top of the first light emitting part 21B.

The rotation assembly 40B comprises a first rotating element 41B, a second rotating element 42B, a third rotating element 43B, and a fourth rotating element 44B, wherein the first rotating element 41B and the second rotating element 42B are positioned between the support assembly 10B and the first light emitting part 21B, allowing the first light emitting part 21B to rotate 360° with respect to the support assembly 10B. The third rotating element 43B and the fourth rotating element 44B are positioned between the top of the first light emitting part 21B and the bottom of the second light emitting part 22B, allowing the second light emitting part 22B to rotate 360° with respect to the first light emitting part 21B.

Specifically, the first rotating element 41B is connected to the top of the support assembly 10B, and the first rotating element 41B is connected to the first rotating folding member 54B and moves around the first rotating folding member 54B. One end of the second rotating element 42B is connected to the bottom of the first light emitting part 21B, and the other end of the second rotating element 42B is rotatably connected to the first rotating element 41B, thereby driving the first light emitting part 21B to rotate and fold with respect to the support assembly 10B.

The third rotating element 43B is connected to a second rotating folding member 55B and can move around the second rotating folding member 55B. One end of the fourth rotating element 44B is connected to the bottom of the second light emitting part 22B, and the other end of the fourth rotating folding assembly 44B is rotatably connected to the third rotating element 43B, thereby driving the second light emitting part 22B to rotate 360° around the first light emitting part 21B, and through the folding motion of the second rotating folding member 55B around the third rotating element 43B, the second light emitting part 22B can be folded onto the first light emitting part 21B, and after folding, the first light emitting part 21B and the second light emitting part 22B are aligned in a straight line.

In this embodiment, the first light emitting part 21B and the second light emitting part 22B can rotate 360° with respect to the support assembly 10B. The second light emitting part 22B can rotate 360° with respect to the first light emitting part 21B. Therefore, the rotary folding lamp in this embodiment has a larger lighting range, and by changing the rotation angle, the lighting direction of different light emitting parts can be changed to meet the different needs of the user.

In other words, the user can change the angle between the first light emitting part 21B and the support assembly 10B between 0° and 180° as needed, and change the angle between the second light emitting part 22B and the first light emitting part 21B between 0° and 180°, thereby obtaining different illumination ranges. At the same time, users can freely rotate the first light emitting part 21B and the second light emitting part 22B between 0° and 360°, so that the first light emitting part 21B can rotate 360° around the support assembly 10B, and the second light emitting part 22B can rotate 360° around the first light emitting part 21B. By rotating and folding at different angles, the lighting direction and lighting range of the first light emitting part 21B and the second light emitting part 22B can be changed, and lighting at any angle and any range can be obtained to meet more needs of the user.

In addition, the second light emitting part 22B is folded over the first light emitting part 21B, and the first light emitting part 21B is further folded over the support assembly 10B. After folding, the second light emitting part 22B, the first light emitting part 21B, and the support assembly 10B are in the same straight line, making the volume of the rotary folding lamp smaller and easier to carry.

In the above three embodiments of the present invention, the user manually folds and rotates, with a folding angle of 0°-180° and a rotating angle of 0°-360°. In other words, within this range, the lamp can stay at any angle as needed.

It is worth mentioning that in the present invention, through the design of the circuit module 33, the first light emitting part 21B and the second light emitting part 22B can be illuminated or turned off automatically during the rotation and folding process, without the need for manual operation by the user.

Figure 11:
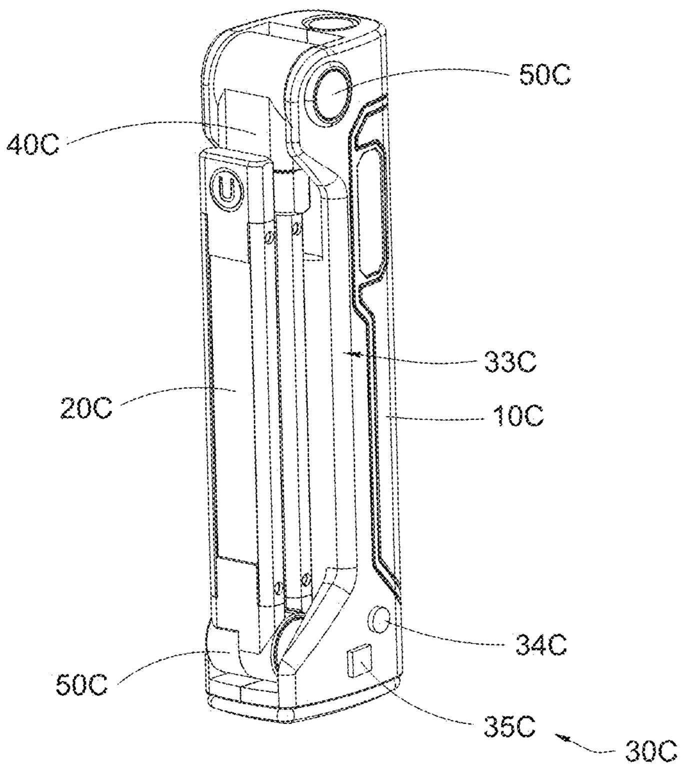
FIG. 11 is a perspective view of a rotary folding lamp according to a fourth preferred embodiment of the present invention.

Referring to FIG. 11, a rotary folding lamp according to a fourth preferred embodiment of the present invention is illustrated. In this embodiment, the above embodiments are improved so that the rotary folding lamp can rotate and fold automatically through a switch.

In this embodiment, the rotary folding lamp comprises a support assembly 10C, a light emitting assembly 20C, a control component 30C, a rotation assembly 40C, and a folding assembly 50C. The light emitting assembly 20C is connected to the support assembly 10C, and the rotation assembly 40C is connected between the light emitting assembly 20C and the support assembly 10C, allowing the light emitting assembly 20C to rotate around the support assembly 10C. The folding assembly 50C is positioned between the light emitting assembly 20C and the support assembly 10C, allowing the light emitting assembly 20C to fold with respect to the support assembly 10C.

Unlike the above first preferred embodiment, in this embodiment, the control component 30C is modified. In this embodiment, the control component 30C comprises a circuit module 33C, a rotation control component 34C, and a folding control component 35C, all of which are positioned on the support assembly 10B. The circuit module 33C is positioned inside the support assembly 10B and is electrically connected to the light emitting assembly 20C, the rotation assembly 40C, and the folding assembly 50C. The circuit module 33C is further connected to the rotation control component 34C and the folding control component 35C.

By manipulating the rotation control component 34C and the folding control component 35C, the user controls the rotation angle and folding angle of the light emitting assembly 20C through the circuit module 33C. By changing the pressing force of the rotation control component 34C and the folding control component 35C, the rotation angle and folding angle of the light emitting assembly 20C can be changed, thereby controlling the position of the light emitting assembly 20C with respect to the support assembly 10C, and thus changing the lighting range of the rotating folding luminaire to meet the different needs of different users.

Figure 12:
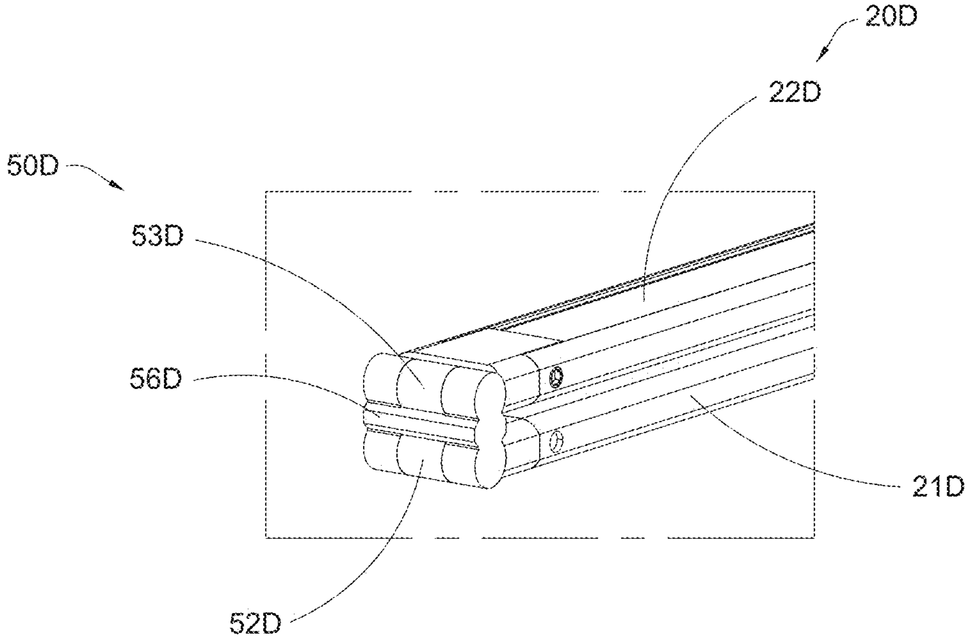
FIG. 12 is a perspective view of a rotary folding lamp according to a fifth preferred embodiment of the present invention.

Referring to FIG. 12, a rotary folding lamp according to a fifth preferred embodiment of the present invention is shown. In this embodiment, modification is applied to the light emitting assembly 20D and the folding assembly 50D provided between the light emitting assembly 20D.

In this embodiment, the light emitting assembly 20D comprises a first light emitting part 21D and a second light emitting part 22D, and the folding assembly 50D comprises a second folding element 52D, a third folding element 53D, and a folding connecting element 56D. The folding connecting element 56D is connected between the second folding element 52D and the third folding element 53D, and the second folding element 52D and the third folding element 53D can rotate around the folding connecting element 56D.

The second folding element 52D is connected to a head end of the first light emitting part 21D, and the third folding element 53D is connected to a tail end of the second light emitting part 22D, so that the second light emitting part 22D can rotate 360° through the second folding element 52D, the third folding element 53D, and the folding connecting element 56D.

In other words, through the folding connecting element 56D, the second light emitting part 22D can be folded towards one side of the first light emitting part 21D, or towards the other side of the first light emitting part 21D. In the above embodiment, the two light emitting parts can only be folded in one direction, with a folding angle ranging from 0° to 180°, while in this embodiment, the two light emitting parts can be folded in both directions, with a folding angle ranging from 0° to 360°.

The second light emitting part 22D can be folded in two directions towards the first light emitting part 21D, making the folding process simpler. During storage, there is no need to consider the folding direction, making it more convenient for the user to use.

On the other hand, through the mutual cooperation of the second folding element 52D, the third folding element 53D, and the folding connecting element 56D, the second light emitting part 22D can be fixed at any folding angle, allowing for a larger adjustable angle range of illumination and meeting more user needs.

Therefore, in the present invention, the two emitting parts can be rotated and folded between each other, and the rotation and folding angles can be switched arbitrarily between 0°-360° according to the requirements, so that the rotating and folding lighting fixture has a larger illumination range and can meet the application requirements of various occasions.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A rotary folding lamp, comprising:

a support assembly, wherein said support assembly comprises an installation housing having an installation cavity provided at an interior of said installation housing and a storage cavity indented from one side of said installation housing at an exterior thereof, and a handle part coupled at another side of said installation housing opposite to said storage cavity, wherein said storage cavity is formed between a top end and a bottom end of said installation housing;

a light emitting assembly, wherein said light emitting assembly comprises a first light emitting part and a second light emitting part which is foldably connected to said first light emitting part, wherein each of said first light emitting part and said second light emitting part has a first end and an opposed second end;

a rotation assembly arranged between said first end of said first light emitting part and said top end of said support assembly to allow said first light emitting part to self-rotate with respect to said support assembly;

a folding assembly arranged between said top end of said support assembly and said rotation assembly to allow said first light emitting part to be folded onto said support assembly; and a control component arranged on said support assembly and electrically connected to said light emitting assembly;

wherein said folding assembly comprises:

a first folding element rotatably coupled between said top end of said installation housing and said first end of said first light emitting part to allow said light emitting assembly being rotatably folded in-and-out said storage cavity; and a folding joint provided between said second end of said first light emitting part and said first end of said second light emitting part, such that said first light emitting part and said second light emitting part are adapted to fold and overlap with each other via said rotation joint in order to rotatably fold into said storage cavity via said first folding element;

wherein said rotation assembly comprises a first rotating element extended from said first folding element of said folding assembly and a second rotating element coupled at said first end of said first light emitting part, wherein said first rotating element is rotatably coupled with said second rotating element, such that said second rotating element is not only rotated 360° around said first rotating element but also pivotally rotated at said first folding element so as to allow said light assembly to be self-rotated and pivotally folded at a desired angle at said top end of said installation housing.

2. The rotary folding lamp, as recited in claim 1, wherein said folding joint of said folding assembly comprises a second folding element coupled at said second end of said first light emitting part, and a third folding element coupled at said first end of said second light emitting part, wherein said third folding element is configured to be movable around said second folding element to allow said second light emitting part to be overlapped with said first emitting part and to be pivotally folded at a desired folding angle between said first emitting part and said second emitting part.

3. The rotary folding lamp, as recited in claim 2, wherein said first rotating element is integrated with said first folding element.

4. The rotary folding lamp, as recited in claim 3, wherein said light emitting assembly further comprises a third light emitting part which is provided on the top end of said support assembly adjacent to said first folding element.

5. The rotary folding lamp, as recited in claim 4, wherein said first light emitting part comprises a first light source, a first attaching surface, and a first light surface opposite to said first attaching surface;

wherein said second light emitting part comprises a second light source, a second attaching surface, and a second light surface opposite to said second attaching surface;

wherein said first light source is provided at said first light surface, and said second light source is provided at said second light surface, wherein after folding, said first attaching surface is attached with said second attaching surface to overlap said first light emitting part with said second light emitting part, and is capable of being aligned in a same straight line with said support assembly to be received in said storage cavity thereof.

6. The rotary folding lamp, as recited in claim 4, wherein said second light emitting part further comprises a third light source provided at said second attaching surface, and such that said second light source and said third light source are respectively installed on two opposite sides of said second light emitting part.

7. The rotary folding lamp, as recited in claim 2, wherein said folding joint of said folding assembly further comprises said folding connecting element rotatably connected between said second folding element and said third folding element, wherein said second light emitting part is capable of folding in two directions towards said first light emitting part and is capable of being fixed at any folding angle between 0° and 360° from one side of said first light emitting part to an opposed side thereof.

8. The rotary folding lamp, as recited in claim 3, wherein said folding joint of said folding assembly further comprises said folding connecting element is rotatably connected between said second folding element and said third folding element, wherein said second light emitting part is capable of folding in two directions towards said first light emitting part and is capable of being fixed at any folding angle between 0° and 360° from one side of said first light emitting part to an opposed side thereof.

9. The rotary folding lamp, as recited in claim 5, wherein said folding joint of said folding assembly further comprises said folding connecting element is rotatably connected between said second folding element and said third folding element, wherein said second light emitting part is capable of folding in two directions towards said first light emitting part and is capable of being fixed at any folding angle between 0° and 360° from said first attaching surface of said first light emitting part to said first light surface thereof.

10. The rotary folding lamp, as recited in claim 6, wherein said folding joint of said folding assembly further comprises said folding connecting element is rotatably connected between said second folding element and said third folding element, wherein said second light emitting part is capable of folding in two directions towards said first light emitting part and is capable of being fixed at any folding angle between 0° and 360° from said first attaching surface of said first light emitting part to said first light surface thereof.

11. The rotary folding lamp, as recited in claim 6, wherein said support assembly comprises a power supply component power supply component installed in said installation cavity wherein said first light source, said second light source, and said third light source are individually controlled by said power supply:

wherein when said light emitting assembly is folded in said storage cavity, said first light emitting part and said second light emitting part are overlapped in said storage cavity at a position that said first light source is received in said storage cavity while said second light source faces outward from said storage cavity, such that said power supply selectively controls said second light source and said third light source;

wherein when said light emitting assembly is unfolded, said first light emitting part and said second light emitting part are unfolded out of said storage cavity, such that said power supply selectively controls said first light source, said second light source and said third light source.

12. The rotary folding lamp, as recited in claim 11, wherein said control component comprises a control switch, a light emitting adjusting component, and a circuit module, said circuit module is electrically connected to said light emitting assembly, said power supply component, said light emitting adjusting component, and said control switch, and said circuit module is installed in said installation cavity, said control switch and said light emitting adjusting component are positioned at an outside of said installation housing.

13. The rotary folding lamp, as recited in claim 11, wherein said control component further comprises a rotation control component and a folding control component, wherein said rotation control component and said folding control component are arranged on an outside of said housing and are electrically connected to said circuit module, said rotation assembly is operatively controlled by said rotation control component, and said folding assembly is operatively controlled by said folding control component.

14. The rotary folding lamp, as recited in claim 11, wherein said support assembly further comprises a first fixing part, a second fixing part, and a third fixing part, all of which are arranged at said bottom end of said installation housing, wherein said first fixing part, said second fixing part, and said third fixing part provide different supporting structures for supporting said support assembly on different areas.

15. A rotary folding lamp, comprising:

a support assembly, wherein said support assembly comprises an installation housing having an installation cavity provided at an interior of said installation housing and a storage cavity indented from one side of said installation housing at an exterior thereof, and a handle part coupled at another side of said installation housing opposite to said storage cavity, wherein said storage cavity is formed between a top end and a bottom end of said installation housing;

a light emitting assembly, wherein said light emitting assembly comprises a first light emitting part, a second light emitting part, and a third light emitting part, wherein said second light emitting part is foldable and rotatably connected to said first light emitting part, and said third light emitting part is arranged on said top end of said installation housing of said support assembly;

a rotation assembly arranged at said first and second ends of said first light emitting part, and through said rotation assembly, said first light emitting part is capable of rotating with respect to said top end of said installation housing of said support assembly and said second light emitting part;

a folding assembly connected to said rotation assembly, and through said folding assembly, said first light emitting part and said second light emitting part are capable of switching between a folded state and an unfolded state; and a control component provided on said support assembly and electrically connected to said light emitting assembly;

wherein said folding assembly comprises:

a first folding element rotatably coupled between said top end of said installation housing and said first end of said first light emitting part to allow said light emitting assembly being rotatably folded in-and-out said storage cavity; and a second folding element rotatably coupled between said second end of said first light emitting part and said first end of said second light emitting part, such that said first light emitting part and said second light emitting part are adapted to fold and overlap with each other via said second folding element in order to rotatably fold into said storage cavity via said first folding element;

wherein said rotation assembly comprises:

a first rotating element extended from said first folding element of said folding assembly;

a second rotating element coupled at said first end of said first light emitting part, wherein said first rotating element is rotatably coupled with said second rotating element, such that said second rotating element is not only rotated 360° around said first rotating element but also pivotally rotated at said first folding element so as to allow said light assembly to be self-rotated and pivotally folded at a desired angle at said top end of said installation housing;

a third rotating element extended from said second folding element of said folding assembly; and a fourth rotating element coupled at said first end of said second light emitting part, wherein said third rotating element is rotatably coupled with said fourth rotating element, such that said fourth rotating element is not only rotated 360° around said third rotating element but also pivotally rotated at said second folding element so as to allow said second light emitting part not only being self-rotated with respect to said first light emitting part but also being pivotally rotated with respect to said first light emitting part.

16. The rotary folding lamp, as recited in claim 15, wherein said first light emitting part comprises a first light source, a first attaching surface, and a first light surface opposite to said first attaching surface, wherein said second light emitting part comprises a second light source, a second attaching surface, and a second light surface opposite to said second attaching surface, wherein said first light source is provided at said first light surface, and said second light source is provided at said second light surface, wherein after folding, said first attaching surface is attached with said second attaching surface to overlap said first light emitting part with said second light emitting part, and is capable of being aligned in a same straight line with said support assembly to be received in said storage cavity thereof.

17. The rotary folding lamp, as recited in claim 16, wherein said first rotating element is integrated with said first folding element while said third rotating element is integrated with said second folding element.

18. The rotary folding lamp, as recited in claim 15, wherein said control component comprises a control switch, a light emitting adjusting component, a circuit module, a rotation control component, and a folding control component, wherein said circuit module is electrically connected to said control switch, said light emitting adjusting component, and said light emitting assembly, wherein said rotation control component is electrically connected to said circuit module for operatively driving said rotation assembly to control rotation of said light emitting assembly within an angle range of 0°-360°, wherein said folding control component is electrically connected to said circuit module for driving said folding assembly to control folding of said light emitting assembly;

wherein said first light source, said second light source, and said third light source are individually controlled by said power supply;

wherein when said light emitting assembly is folded in said storage cavity, said first light emitting part and said second light emitting part are overlapped in said storage cavity at a position that said first light source is received in said storage cavity while said second light source faces outward from said storage cavity, such that said power supply selectively controls said second light source and said third light source;

wherein when said light emitting assembly is unfolded, said first light emitting part and said second light emitting part are unfolded out of said storage cavity, such that said power supply selectively controls said first light source, said second light source and said third light source.

19. The rotary folding lamp, as recited in claim 15, wherein said first light source, said second light source, and said third light source are individually controlled by said power supply:

wherein when said light emitting assembly is folded in said storage cavity, said first light emitting part and said second light emitting part are overlapped in said storage cavity at a position that said first light source is received in said storage cavity while said second light source faces outward from said storage cavity, such that said power supply selectively controls said second light source and said third light source;

wherein when said light emitting assembly is unfolded, said first light emitting part and said second light emitting part are unfolded out of said storage cavity, such that said power supply selectively controls said first light source, said second light source and said third light source.

* * * * *